May 12, 1925.
H. BARKMANN
HOOK
Filed June 25, 1924
1,537,730
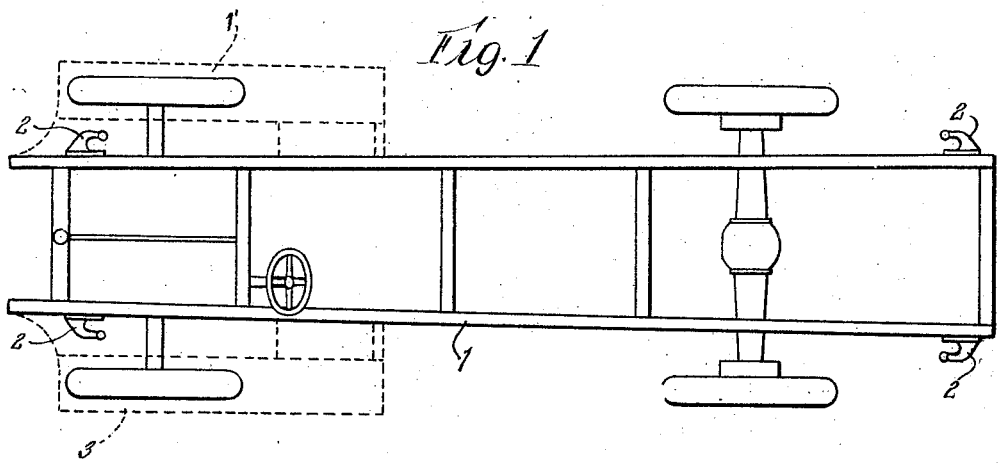
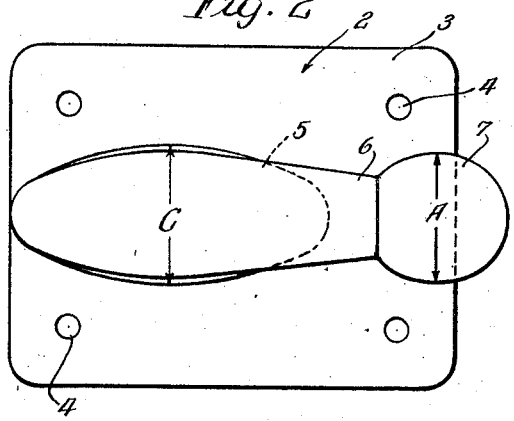
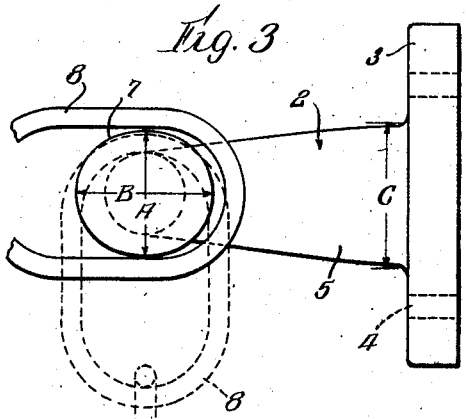
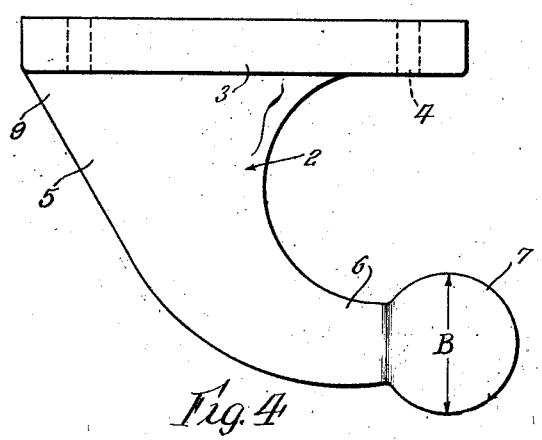
Inventor:
Henry Barkmann
By: Wm. O. Bell
Atty.

Patented May 12, 1925.

1,537,730

UNITED STATES PATENT OFFICE.

HENRY BARKMANN, OF CHICAGO, ILLINOIS.

HOOK.

Application filed June 25, 1924. Serial No. 722,236.

*To all whom it may concern:*

Be it known that I, HENRY BARKMANN, a citizen of the United States, residing at Chicago, in the county of Cook and State of Illinois, have invented certain new and useful Improvements in Hooks, of which the following is a specification.

This invention relates to a novel and improved hook, particularly adapted for attachment to a frame of an automobile for use with a towing line or chain.

The principal object of my invention is to provide a hook which will possess great strength and which will retain a chain or line thereon but which will permit easy removal of a chain or line.

A further object is to provide a hook placed in such a position on a frame of an automobile when a chain attached thereto breaks there will be substantially no danger of injury to persons nearby.

With the increased number of automobiles and trucks in use the number of breakdowns and stallings have increased in proportion. This is particularly true in the case of trucks which have to work in unpaved places and it is therefore greatly to be desired that efficient means be provided for one truck to help out another when it has become stalled. For that purpose chains are usually carried, and in the absence of chains anything which may be used as a line is employed. It is common in such places as team yards at freight terminals and similar places to find quantities of wire such as used for barrel hoops, for baling hay and other purposes and pieces of this wire are commonly made use of to pull a mired truck out of the mud or to give a start to a truck. When such wire is used it straightway is pulled to a certain form upon the hook and difficulty is had in removing it. The same is true of a rope that has any appreciable stiffness. When a chain is used it usually is lost from the hook in short order.

My invention comprises a hook of such shape as to permit easy placing and removal of a chain, or the like, but when the chain is left to hang it can not come off but is locked upon the hook. Furthermore, my hook is so shaped that a line, whether of wire or rope, which has been pulled tightly into a set form, may be easily removed.

In the drawings in which I have illustrated a preferred embodiment of my invention, Fig. 1 is a plan of an automobile chassis or frame with four of my hooks placed in position thereon.

Fig. 2 is a side elevation of my improved hook in position.

Fig. 3 is a view taken at right angles to Fig. 2, and

Fig. 4 is a plan view of my improved hook.

Referring now to the drawings, the numeral 1 designates a frame or chassis of a truck on the side members of which I place my improved hook designated generally at 2. As will be plain from Fig. 1, these hooks are so placed as to be able to pull when going either forwardly or rearwardly.

The commercial trucks are usually provided with mud guards 1' and it will be noted that the hooks placed at the forward end of the frame are under these mud guards. The result of this is that when a chain or line attached to these hooks breaks under tension, the loose end thereof is caught under the mud guard and thus injury to any person standing nearby is avoided. Similarly, the hooks at the rear end of the frame are mounted under the body of the truck, not shown, and therefore a chain or line attached to these hooks, if broken, will fly under the body and thus prevent injury to bystanders.

My improved hook comprises a base plate 3 preferably provided with a plurality of bolt holes 4 for attachment to a support such as a chassis. Integral with the base plate 3 is the shank 5 terminating in a reduced neck 6 to which is connected the enlarged head 7.

Referring to Figs. 3 and 4, it will be noted that the dimension A of the head 7 is materially less than the dimension B, the dimension A being such as to permit ready placing of a link 8 of a chain over the head when in the position shown in full lines in Fig. 3, namely, in a horizontal position. As soon as the chain is permitted to drop from this position it is locked on the hook due to the fact that the dimension B is greater than the inside width of the link. Therefore, the chain is always locked on the hook except when it is brought to the horizontal position shown in full lines in Fig. 3 for the purpose of either removing or placing it on the hook. When not in use the chain drops to some such position as that shown in dotted lines in Fig. 3 where it is evident that it can not be accidentally removed.

The dimension C of the base of the shank 5 is appreciably greater than the dimension A of the head and the reason for this is that, as stated above, a line, particularly a wire line, after tension has been placed upon it, becomes set rigidly to the form of the hook and therefore it is difficult to remove over a large head. However, with the relative dimensions A and C which I have described above, all that is necessary is to merely slip the line off over the head, keeping it in a horizontal position for this purpose. By this arrangement it makes no difference how tightly a noose or any other knot has been drawn, nor how rigidly a line, such as a wire, has become set.

As will be noted particularly in Fig. 4, the head of the shank is advanced a substantial distance from the base of the shank 6 providing for ample space at the base for bracing and the base of the shank is extended substantially to the edge of the plate as indicated at 9, thereby providing a brace of great strength.

I have found my hook to be extremely efficient and satisfactory in use and if made of a proper grade of steel it will resist any usage to which it may be fairly subjected, a chain or line invariably breaking before the hook will break. It will be seen that I have devised a hook which is not only strong and durable but also one which may be readily attached to a truck frame, which will permit ready placing and removal of a chain or the like and which will lock a chain in position against accidental removal and will also permit ready removal of a line which has been drawn taut and has become set in rigid form.

I am aware that changes in the form, construction and arrangement of parts may be made without departing from the spirit and without sacrificing the advantages of the invention and I reserve the right to make all such changes as fairly fall within the scope of the following claim.

I claim:—

A hook having a head and a base plate, a shank joining said head and base plate, means for securing said base plate to a support with said shank in a horizontal position, the vertical dimension of the base of said shank adjacent said base plate being greater than the vertical dimension of said head and the vertical dimension of said head being less than the horizontal dimension of said head when said hook is thus secured to a support.

HENRY BARKMANN.